(12) United States Patent
Santori et al.

(10) Patent No.: US 12,325,926 B2
(45) Date of Patent: Jun. 10, 2025

(54) METHOD FOR MANUFACTURING A SURFACE OF A PRESS ELEMENT, PRESSING ELEMENT OBTAINED BY SUCH METHOD AND METHOD FOR THE PRODUCTION OF COATED PANELS USING SUCH PRESS ELEMENT

(71) Applicant: Sesa S.p.A., Olgiate Olona (IT)

(72) Inventors: Marco Santori, Olgiate Olona (IT); Carlo Umberto Santori, Olgiate Olona (IT); Luca Santori, Olgiate Olona (IT)

(73) Assignee: Sesa S.p.A., Olgiate Olona (IT)

( * ) Notice: Subject to any disclaimer, the term of this patent is extended or adjusted under 35 U.S.C. 154(b) by 8 days.

(21) Appl. No.: 18/068,625

(22) Filed: Dec. 20, 2022

(65) Prior Publication Data
US 2023/0220578 A1 Jul. 13, 2023

(30) Foreign Application Priority Data
Dec. 21, 2021 (EP) .................................... 21425071

(51) Int. Cl.
*C25D 5/14* (2006.01)
*B30B 15/06* (2006.01)
(Continued)

(52) U.S. Cl.
CPC .............. *C25D 3/04* (2013.01); *B30B 15/062* (2013.01); *C25D 5/022* (2013.01); *C25D 5/14* (2013.01);
(Continued)

(58) Field of Classification Search
CPC ..................................................... C25D 3/04
See application file for complete search history.

(56) References Cited

U.S. PATENT DOCUMENTS

| 4,006,072 A * | 2/1977 | Takayasu ................. C25D 3/04 |
| | | 204/290.14 |
| 10,208,392 B1 * | 2/2019 | Reichert ................ C25D 5/627 |

(Continued)

FOREIGN PATENT DOCUMENTS

| CA | 2817270 C | 11/2017 |
| JP | H04350193 A | 12/1992 |
| JP | H109296292 A | 11/1997 |

OTHER PUBLICATIONS

English translation DE102020109202 (Year: 2020).*
English translation CN 111850640 (Year: 2020).*
European Search Report of EP21425071 issued on Jun. 4, 2022.

*Primary Examiner* — Stefanie S Wittenberg
(74) *Attorney, Agent, or Firm* — Silvia Salvadori, P.C.; Silvia Salvadori

(57) ABSTRACT

A method for processing a smooth or structured surface of a pressing element is described, the method comprising the steps of: a) chrome-plating said surface of the pressing element so as to form a coating comprising a first layer having chrome grains oriented in a first direction and a second layer overlapping said first layer, said second layer having chrome grains oriented in a second direction which is different from said first direction; b) applying a mask on the chrome-plated surface of the pressing element by means of a digital printing technology; c) chemically treating the chrome-plated surface of the pressing element on which said mask was applied, said chemical treatment being performed so as to partially remove said chrome coating in the exposed areas of said chrome-plated surface, i.e. in the areas not being protected by said mask, and d) removing said mask from the chrome-plated surface of the pressing element, obtaining a smooth or structured surface having a coating with areas having a different grade of gloss and colour.
A pressing element obtained by the above processing method and a method for the production of coated panels,
(Continued)

such as panels for furniture or floors, bearing a predetermined decorative pattern which uses such pressing element are also described.

13 Claims, 1 Drawing Sheet

(51) Int. Cl.
*C25D 3/04* (2006.01)
*C25D 5/00* (2006.01)
*C25D 5/02* (2006.01)
*C25D 5/48* (2006.01)

(52) U.S. Cl.
CPC ............... *C25D 5/48* (2013.01); *C25D 5/605* (2020.08); *C25D 5/627* (2020.08)

(56) References Cited

U.S. PATENT DOCUMENTS 10,563,309 B1 * 2/2020 Wagenknight ........... C25D 5/48
2016/0193866 A1   7/2016 Stoffel et al.

* cited by examiner

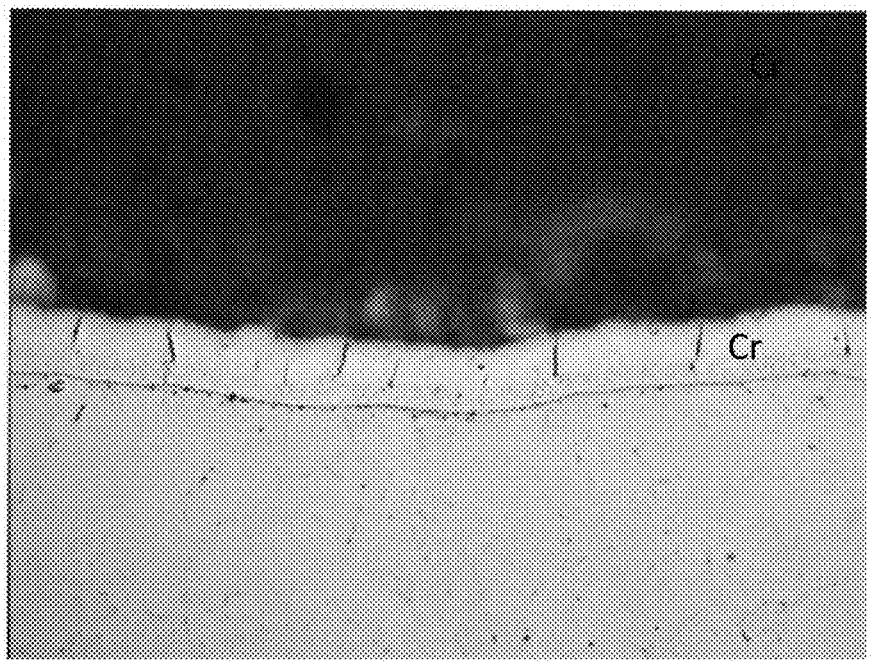

METHOD FOR MANUFACTURING A SURFACE OF A PRESS ELEMENT, PRESSING ELEMENT OBTAINED BY SUCH METHOD AND METHOD FOR THE PRODUCTION OF COATED PANELS USING SUCH PRESS ELEMENT

Method for manufacturing a surface of a press element, pressing element obtained by such method and method for the production of coated panels using such press element This application claims priority to and the benefit of European Patent Application No. 21425071.4 filed on Dec. 21, 2021, the content of which is incorporated herein by reference in its entirety.

DESCRIPTION

Field of Application

In its more general aspect, the present invention relates to the surface processing of a pressing element or tool used to print a predetermined decorative pattern on a surface-coating synthetic material of a panel, such as a panel for furniture or floors.

In particular, the present invention relates to a method for processing a smooth or structured surface of a pressing element of the above type in order to give different grades of gloss or different colours to the surface.

The present invention further relates to a pressing element or tool with a smooth or structured surface and having a coating with areas having a different grade of gloss and colour obtained by a processing method as above.

The present invention also relates to a method for the production of coated panels, particularly but not exclusively coated panels for furniture or floors, using a pressing element as above.

Prior Art

It is known in the art that pressing elements (or tools) in the form of pressed sheets or conveyor belts, preferably of stainless steel, are used in the wood processing industry, in particular in processing wood-based panels decorated with a desired decorative pattern, such as for example a pattern which reproduces a natural surface structure like a wood-effect pattern.

In order to reproduce the desired decorative pattern, the pressing element has a surface suitably structured and pro- cessed with different grades of gloss.

The pressing element is used for pressing wooden panels, for example panels with a wood-based substrate coated with a synthetic coating material, usually one or more layers or films of a thermosetting plastic resin, at a given pressure and temperature in hydraulic heat presses.

During pressing, the temperature and pressure conditions used make the resin liquid and a polycondensation occurs which involves the resin crosslinking to an extent depending on pressing time and temperature. At the end of pressing, the crosslinked resin is in a solid state in which the resin surface faithfully reproduces the structured surface of the pressing element and the different grades of gloss thereof.

The structuring of the pressing element surface and the processing thereof to obtain different grades of gloss or colour are thus essential to obtain wooden panels which reproduce the desired decorative pattern as realistically as possible.

In the state of the art, there are different methods for structuring the pressing element surface, usually with the aid of digital printing technology, so that the decorative papers being used can also be produced according to the digital printing process.

A method widely used in the prior art provides that the structuring of the pressing element surface is performed with repeated masking steps with a chemically-resistant wax alternated with chemical etching steps in the surface areas of the pressing element not being covered by the mask. This allows to apply masks again and again on the existing structures and thereby to perform many etching processes in a precise manner the one after the other, for example to obtain a deep structure.

In this way, the pressing element is provided with a relief comprising higher areas, and lower areas on the pressing surface thereof.

The processing of the pressing element surface continues then to obtain different grades of gloss by using metal coatings such that the surface acquires a desired grade of gloss. The grade of gloss is responsible for the fact that, once the pressing of the wooden panels by the pressing element has occurred, the surface of said pressed wooden panels acquires different shadings and different chromatic reflections.

A method of the above type is described for example in the patent application EP2626216 and it comprises, for defining the different grades of gloss, steps of chrome-plating the surface of the previously-structured embossing element, of applying a mask on the chrome-plated surface, and of metal coating or mechanically or chemically post-treating the surface provided with the mask, wherein the last two steps are repeated at least once for partial areas on the surface of the embossing element.

Although the above-noted pressing elements of the prior art allow to obtain different shadings and different chromatic reflections with respective transfer on a coating material of a substrate, in particular a wood-based substrate, they are not free from drawbacks, among which in particular the fact that the appearance of the surface structure given to the material processed by the pressing element is often perceived as considerably different from that of the natural structure to be imitated, for example if an appearance which is similar to that of natural wood (wood-effect structure) is to be obtained.

The main object of the present invention is therefore to develop an improved pressing element and a respective method for obtaining it which allow not only to make different shadings and different chromatic reflections with respective transfer on a coating material of a substrate, in particular a wood-based substrate, but also to improve the appearance of the surface structure given to the coating material by the pressing element so as to give it an appearance which is more similar to that of the natural material to be imitated.

A further object of the present invention is to develop a method for the production of coated panels, in particular coated panels for furniture and coated panels for floors, which allows to improve the natural appearance of the surface structure given by the use of a pressing element as above.

SUMMARY OF THE INVENTION

These objects are mainly achieved by a method for processing a smooth or structured surface of a pressing element, the method comprising the steps of:

a) chrome-plating said surface of the pressing element so as to form a coating comprising a first layer having chrome grains oriented in a first direction and a second layer overlapping said first layer, said second layer having chrome grains oriented in a second direction which is different from said first direction;

b) applying a mask on the chrome-plated surface of the pressing element by means of a digital printing technology;

c) chemically treating the chrome-plated surface of the pressing element on which said mask was applied, said chemical treatment being performed so as to partially remove said chrome coating in the exposed areas of said chrome-plated surface, i.e. in the areas not being protected by said mask, d) removing said mask from the chrome-plated surface of the pressing element, obtaining a smooth or structured surface having a coating with areas having a different grade of gloss and colour.

Preferably, the above chemical treatment is performed so as to remove only said second layer of chrome grains or part thereof in the exposed areas of said chrome-plated surface.

In an embodiment of the present method, the chrome-plating of the smooth or structured surface of the pressing element comprises the steps of:

arranging said pressing element in a chrome-plating bath containing a chrome-plating agent in a first arrangement;

performing a first chrome-plating on the smooth or structured surface of said pressing element arranged in the chrome-plating bath in said first arrangement for a predetermined time so as to form said first layer having chrome grains oriented in said first direction;

rotating the pressing element by a predetermined angle around an axis which is substantially perpendicular to said smooth or structured surface so as to arrange said pressing element in said chrome-plating bath in a second arrangement;

performing a second chrome-plating on the smooth or structured surface of said pressing element arranged in the chrome-plating bath in said second arrangement for a predetermined time so as to form said second layer having chrome grains oriented in said second direction.

Advantageously, this allows a distribution of the chrome grains according to different directions ensuring a better resistance of the chrome layer in the following chemical treatment step.

In another embodiment of the present method, the step of chemically treating the chrome-plated surface of the pressing element on which said mask was applied comprises the steps of:

dipping said pressing element in an acid solution and keeping it in the solution for a time which is sufficient to achieve a partial chemical treatment of said chrome-plated surface, extracting said pressing element from said acid solution and keeping it outside said acid solution for a predetermined time, dipping again said pressing element in said acid solution and keeping it in the solution for a time which is sufficient to complete the chemical treatment of said chrome-plated surface.

Advantageously, extracting and keeping the pressing element outside the acid solution for said predetermined time before completing the chemical treatment allows the chemical reaction to be stopped and the sheet surface to be oxygenated thereby improving the chemical treatment effect on the chrome-plated surface of the pressing element.

In an embodiment of the present method, the surface of the smooth or structured pressing element is pre-treated before said chrome-plating step a) and the pre-treatment is performed by polishing or sandblasting.

In another embodiment of the present method, the pressing element surface is structured so as to have a raised pattern comprising higher areas and lower areas. In this embodiment, the structuring of the pressing element surface comprises the steps of:

applying a mask on the pressing element surface;
chemically treating the pressing element surface on which said mask was applied;
removing said mask from the pressing element surface;
mechanically brushing the pressing element surface;
optionally sequentially repeating the above-mentioned steps for a predetermined number of times as necessary.

In an embodiment, the method according to the invention can further comprise after said step d) of removing the mask from the chrome-plated surface, a following step of sandblasting the pressing element surface to increase the reflectance of the pressing element.

In a further embodiment, the method according to the invention can further comprise sequentially repeating at least once the above steps a) to d).

In a further embodiment, the method according to the invention can comprise a further chrome-plating of the pressing element surface after said step c) of chemically treating the chrome-plated surface and before said step d) of removing the mask from the pressing element.

The above objects are also achieved by a pressing element with a smooth or structured surface having a coating with areas having a different grade of gloss and colour which can be obtained by a processing method as indicated above. The coating comprises a first chrome layer with chrome grains deposited along a first direction and a second chrome layer with chrome grains deposited along a second direction and it has chemically untreated areas with a specific grade of gloss and colour, and other chemically treated areas with a different grade of gloss and colour.

The above objects are also achieved by a method for the production of coated panels, such as panels for furniture or floors, bearing a predetermined decorative pattern using a pressing element produced according to the above-described embodiments of the method for processing a surface of a pressing element. The method for producing coated panels comprises the steps of:

providing panels comprising each a substrate which is, preferably, wood-based and an upper layer of a synthetic material;

providing a pressing element as described above bearing on the processed surface thereof said predetermined decorative pattern;

pressing said panels by means of said pressing element so as to transfer said decorative pattern from said pressing element to said upper layer of synthetic material of said panels.

Advantageously this allows to obtain a wood-based panel with a highly realistic decorative pattern because of the different shadings and of the different chromatic reflections.

Further features and advantages of the present invention will be apparent from the following description of some embodiments given by way of non-limiting examples with reference to the attached drawings.

BRIEF DESCRIPTION OF THE DRAWINGS

In the attached drawings:

FIG. 1 shows a scanning electron microscope image with ×1000 magnification of the cross-section of the pressing element surface after the chemical treatment step of the method described in an embodiment of the present invention.

DETAILED DESCRIPTION

A method according to the invention for processing the surface of a pressing element in the form of a pressed sheet in order to obtain different grades of gloss and colour is now described in detail. Although the following description of the surface processing method is done with reference to a pressed sheet, it must be understood that such method can be applied to pressing elements in general, also in other forms.

In the processing method according to the invention, the starting pressing element can be composed of a sheet, preferably of stainless steel, with a thickness and grain which are predefined depending on the target application, for example for a low-pressure or high-pressure application. The sheet can be provided already grinded or otherwise it can undergo a grinding with procedures being conventional per se.

After the possible grinding, the sheet can undergo a series of surface processing steps before chrome-plating in order to form a structured surface bearing a pattern to be applied.

In this regard, the sheet can undergo at first an optional washing step in an alkaline degreasing solution to eliminate possible impurities left by the grinding operation followed by rinsing with water and drying, for example with compressed air. These operations are conventional per se and well known to the person skilled in the art.

Afterwards, the sheet undergoes a step of writing the predetermined pattern by means of a digital printing technology from a file containing the pattern suitably preloaded on a computer which is connected with a writing head (e.g. a plotter). This operation is conventional per se and can be performed by applying a liquid containing a photosensitive substance in specific areas of the surface being processed of the sheet by means of said writing head (plotter) suitably controlled by said computer. The following polymerization of the photosensitive substance, for example, in air or by UV, causes the liquid drying and the creation of a coating layer (wax) in the covered areas of the sheet surface. The coating layer (resist) is etching-resistant, in particular to chemical corrosion, thus constituting a mask which protects the covered areas of the sheet surface from the following chemical treatment (corrosion).

After the writing step, the sheet undergoes a corrosion (etching) on the surface being processed by means of a chemical treatment with an acid solution according to a procedure which is conventional per se. This procedure can provide the dipping of the sheet in a tank containing an acid solution for a predetermined time, for example from 1 minute to 30 minutes, depending on the etching depth and on the profile to be obtained. Since the areas of the sheet surface covered by the mask resist to the acid corrosive action while the uncovered areas of the surface are corroded, the above chemical treatment determines the structuring of the surface reproducing the three-dimensionality of the desired pattern and thus creating the pattern low relief and high relief.

At the end of the chemical treatment, the sheet can be rinsed and undergo a following step of removing the resist layer by means of a treatment with a degreasing solution at a predetermined temperature and time, for example at a temperature of 50-70° C. and a time of 30-45 minutes.

After removing the resist layer, the sheet can undergo a step of mechanically brushing the structured surface of the pressing element to rough out the just-structured surface and to define the profile of the created pattern.

In this regard, the structured surface of the pressing element can be mechanically brushed by a roller coated with an abrasive material having a suitable granulometry depending on the type of processing required by the structuring.

The above-described steps of the method can be sequentially repeated for a number of times as many as are the etching levels needed for creating the desired structuring of the pressing element surface.

Advantageously this allows to define a structuring of the pressing element surface which is a highly faithful reproduction of the desired decorative pattern.

After structuring, the structured sheet surface can undergo a preliminary treatment to prepare it to processing according to the present invention aimed at creating areas having a different grade of gloss and colour.

The pre-treatment can comprise a polishing or sandblasting operation of the sheet surface and it can be performed with methods known in the art.

For example, sandblasting can be performed in a sandblasting chamber with different sand granulometries selected on the basis of the surface finish to be made.

The residence time in the sandblasting chamber and the pressure thereof depend on the type of finish and gloss of the surface to be obtained.

In accordance with the present invention, said pre-treatment step can be performed both on the pressing element surface when it is structured so as to have a raised pattern comprising higher areas and lower areas, and on the pressing element surface when it is used as smooth, that is without any structuring of the raised pattern.

The smooth or structured surface as described above of the pressing element (sheet) and possibly pre-treated as described above, undergoes afterwards a series of processing operations to create areas having a different grade of gloss and colour in accordance with the method of the present invention.

In this regard, in a first processing, the surface of the sheet is chrome-plated so as to form a coating comprising a first layer having chrome grains oriented in a first direction and a second layer overlapping said first layer, said second layer having chrome grains oriented in a second direction which is different from said first direction.

In greater detail, in a preferred embodiment of the invention, the sheet is dipped in a chrome-plating bath containing a chrome-plating agent, for example a hexavalent-or-trivalent-chrome-based electrolytic solution, fixed in the bath on a proper support in a first arrangement and then connected to the anode of an electrolytic cell of the bath.

Thus, the sheet undergoes a first chrome-plating step for a predetermined time by electric current flow which causes the deposition of a first chrome layer on the sheet surface with grains oriented along a first direction on the surface.

At the end of the first chrome-plating step, the sheet is rotated by a predetermined angle around an axis which is substantially perpendicular to the smooth or structured surface thereof, thus fixed again to said support so as to take a second arrangement in the chrome-plating bath and connected again to the anode of the electrolytic cell of the chrome-plating bath.

At this stage, the sheet undergoes a second chrome-plating step for a predetermined time letting the electric current flow again, which causes the deposition of a second chrome layer on the sheet surface, above the first layer, with grains oriented along a second direction on this surface which is different from the above first direction.

This chrome-plating treatment in two steps with the sheet located in the bath in two different arrangements allows to obtain a denser crosslinking of chrome deposition grains and an overall thickness which is greater than the chrome coating. In this way, advantageously, in a following step aimed at obtaining areas with a different grade of gloss and colour a targeted corrosion can be performed on the exposed areas so as to remove only part of the chrome coating preventing the corrosive agent, for example an acid, from reaching the metal material of the underlying sheet and thus from damaging or jeopardising the structure of the sheet surface.

In the method according to the invention, the first chrome-plating and the second chrome-plating of the sheet can be performed by direct chrome-plating (i.e. continuous) or intermittent chrome-plating (pulse). The operative parameters for performing the above chrome-plating operations, such as for example the applied current and voltage values, the pulse number and duration, the chrome-plating time etc. can be determined by the person skilled in the art according to contingent and specific requirements.

In particular, the residence time of the pressing element in the chrome-plating bath and the temperature of the chrome-plating solution can be varied as necessary and the combination thereof defines the appearance and the reflectance that the pressing element surface will have at the end of the chrome-plating process, that is it defines a basic colour and/or grade of gloss on which the contrast and the different grades of gloss and/or colour of the pressing element will be defined later.

The overall duration of the chrome-plating can vary in a range of few minutes, for example from 10 minutes up to about 2 hours. For example, in case of direct chrome-plating, the overall chrome-plating time (first chrome-plating step and second chrome-plating step) can be comprised in a range from 10 minutes to 30 minutes while in case of pulse chrome-plating the overall chrome-plating time can vary from 60 minutes to 2 hours.

The temperature of the chrome-plating bath can be comprised in a range from 30° to 60°, for example 40-50° C.

Preferably, the angle of rotation of the sheet around its own axis which is substantially perpendicular to the surface thereof can be comprised in the range between greater than 0° and 180°. Preferably, the angle is of about 180° so as to have chrome grains of the first layer and chrome grains of the second layer deposited on the sheet surfaces which are oriented in substantially opposite directions.

In an embodiment of the method according to the invention, the rotation of the sheet is preferably performed at about half the residence time of the sheet in the chrome-plating bath, i.e. at about half the overall chrome-plating duration (first chrome-plating step and second chrome-plating step).

The overall thickness of the chrome coating can be preferably comprised between 10 μm and 25 μm, in particular between 10 μm and 15 μm with the first chrome layer of the coating obtained at the end of the first chrome-plating step which can have a thickness comprised in a range from 5 μm to 7 μm, and the second chrome layer obtained at the end of the second chrome-plating step, which can have a thickness comprised in a range from 8 μm to 15 μm.

The step of chrome-plating the element has a finishing function, since it defines the aesthetic appearance and the grade of gloss (reflectance) of the surface, and a second protection function since the deposited chrome layer increases the hardness of the pressing element surface.

In particular, with the method of the invention, the chrome-plated surface has a basic grade of gloss and colour which appears as glossy or matt on which the contrast and the different grades of gloss and colour of the pressing element will be defined later further to the following chemical treatment step.

Preferably, the basic grade of gloss measured on the chrome-plated surface of the pressing element is comprised between 5° g.u. and 100° g.u. as measured according to EN13722:2004.

At the end of the chrome-plating step, a step of cleaning the chrome-plated sheet can be performed to improve the adhesion of the mask applied in the following step of the method.

The cleaning step can be performed by washing the chrome-plated sheet in a tank containing an alkaline degreasing solution at a predetermined temperature according to procedures known to the person skilled in the art. At the end of washing, the chrome-plated sheet can be rinsed with water at high pressure and dried for example with compressed air.

The residence time of the sheet in the cleaning tank varies depending on the quantity of residues to be removed and it can be preferably comprised in a range between 10 minutes and 30 minutes.

At the end of the cleaning step, the step of applying a mask on the pressing element surface is performed, which will define the desired decorative pattern and protect the parts of the sheet which must not be matted by the chemical treatments which will be performed in the following steps of the method.

In particular, the mask application on the chrome-plated surface of the sheet can be performed similarly to what was already previously described with regard to the structuring of the sheet surface, i.e. by means of a digital printing technology with an industrial plotter which reproduces the desired decorative pattern through a writing coating based on the data of a graphic file preloaded by a computer (PC). The writing coating is spread on the areas of the chrome-plated surface to be protected from the following chemical treatment by means of a writing head at a feed frequency and speed varying on the basis of the finish to be reproduced and it could be for example a photosensitive liquid which, by air-or-UV-polymerization, is fixed on the surface element.

At the end of the mask application, the step of chemically treating the pressing element surface is performed.

In this regard, the chrome-plated sheet is dipped in an acid aqueous solution, for example an aqueous solution of hydrochloric acid, having a concentration preferably between 7% and 10% by weight on the weight of the solution, for example 10% and kept in the solution for a predetermined time so as to remove only part of the chrome-plating coating not being protected by the previously-applied mask, in particular preferably only the outermost second chrome layer or part thereof.

The residence time of the sheet in the acid solution can be comprised in a range from 1 minute to 10 minutes. Preferably, said residence time is comprised between 2 minutes and 4 minutes, for example about 4 minutes.

The residence time of the pressing element in the acid solution defines the matting intensity which will be made on the chrome-plated surface of the pressing element in the areas not being protected by the mask and thus undergoing the chemical treatment. Hence, these chemically treated areas of the chrome-plated surface will have a grade of gloss and colour which is different from the basic one of the chemically untreated areas of the chrome-plated surface resulting to be matter than those chemically untreated areas of the chrome-plated surface.

In particular, at the end of the chemical treatment, these chemically treated areas of the chrome-plated surface can have a grade of colour comprised between 0° and 10° as measured according to UNI EN ISO/CIE 11664-4:2019.

It was surprisingly found that the only partial removal of the chrome coating from the sheet surface allows to create microcracks in the chrome-plated surface which have the characteristic of being recesses with a different depth in which the incident light is trapped. This causes an increase in the matting of the residual chrome in the chemically treated areas of the surface which can be substantially pushed to "black" thereby increasing the colour contrast effect between the chemically treated areas and the chemically untreated areas.

It follows that the appearance of the decorative pattern transferred to the target panel from the pressing element proves to be improved; in particular the three-dimensionality effect of the pattern given by the pressing element is increased as well as the parts printed on the surface of the panel are more visible thereby also improving the "natural" appearance of the finish given to the panel which will be a more realistic imitation of the reference natural material, for example wood.

FIG. 1 shows a scanning electron microscope image with ×1000 magnification of the cross-section of the pressing element surface obtained from the above-described chemical treatment step.

In particular, it can be seen from FIG. 1 that the above microcracks are created only in the upper chrome layer, that is the one deposited in the second chrome-plating step, and they are recesses with a different depth that trap the incident light which penetrates therein. Otherwise, the surface of the chrome-plating element not being chemically treated since it is protected by the photosensitive liquid, has not these microcracks and therefore it reflects the light incident thereon.

Advantageously this allows different grades of gloss and colour to be defined on the pressing element surface.

In another embodiment of the processing method of the invention, the chemical treatment on the exposed areas of the chrome-plated surface (i.e. not covered by the mask) can be performed in two steps interspersed with the extraction of the sheet from the acid solution and the keeping of the sheet outside it for a predetermined time, preferably a time comprised between 30 seconds and 60 seconds, for example 30 seconds.

Advantageously, this stops the chemical reaction preventing the microcracks from becoming too deep thus also significantly removing chrome grains of the first layer or lower layer deposited in the first chrome-plating step.

At the end of the step of chemically treating the chrome-plated surface, the sheet can be rinsed and undergo a following step of removing the mask (resist) layer by means of a treatment with a degreasing solution at a predetermined temperature and time, for example at a temperature of 50-70° C. and a time of 30-45 minutes.

In other embodiments, the method according to the invention can comprise other following steps after the above-described chrome-plating and chemical treatment of the chrome-plated surface to further modify the appearance of the chrome-plated surface of the pressing element, for example to increase the reflectance of the pressing element, to enhance the different grades of gloss and colour of the desired decorative pattern or to protect it.

For example, in an embodiment, the method according to the invention can comprise, after the above-described chrome-plating and chemical treatment of the chrome-plated surface, a following step of mechanically peening the pressing element surface to increase the reflectance of the pressing element.

The peening can be performed with procedures being conventional per se and preferably by using ceramic or glass microspheres at a variable pressure generally not exceeding 3 bars, so as to increase the reflectance in general of the pressing element.

Instead, in another embodiment, the sequential steps of applying a mask, chrome-plating, chemically treating the chrome-plated surface and removing the mask as described above can be repeated at least once, for example to increase the treated areas with a different grade of gloss and colour and/or to enhance the different grades of gloss and colour of the desired decorative pattern.

In yet another embodiment, the method according to the invention can comprise, after the above-described chrome-plating and chemical treatment of the chrome-plated surface, a further chrome-plating followed by the removal of the mask in order, for example, to protect the decorative pattern formed with different grades of gloss and colour by means of a further chrome-plating layer.

The above steps of applying a mask, chrome-plating and removing a mask can be performed with procedures being conventional per se.

Upon execution of the steps of the above-described method, the pressing element surface (sheet) having areas with a different grade of gloss and colour can be coated with a release agent with procedures being conventional per se, for example by spraying with an airbrush gun at a pressure comprised in a range from 0.8 bar to 2 bars.

With the method according to the invention, a pressing element with a smooth or structured surface is obtained, having a coating with areas having a different grade of gloss and colour, wherein the coating comprises a first chrome layer with chrome grains deposited along a first direction and a second chrome layer with chrome grains deposited along a second direction and it has chemically untreated areas with a specific grade of gloss and colour and other chemically treated areas with a different grade of gloss and colour.

The pressing element can be used in all those technical fields in which a desired decorative pattern must be reproduced in a faithful and realistic manner by pressing, such as for example in processing wood-based decorated coated panels which are commonly used in the production of furniture, floors, walls, etc.

The wood-based panels could be for example wooden panels of the coated type being well known in the art which comprise at least one wood-based substrate and an upper decorative layer based on a synthetic material such as for example thermosetting plastic resins.

A method according to the invention for the production of such coated panels can comprise the steps of:
providing panels comprising each a substrate which is, preferably, wood-based and an upper layer of a synthetic material;
providing a pressing element as described above bearing said predetermined decorative pattern on the processed surface thereof;

pressing said panels by means of said pressing element so as to transfer said decorative pattern from said pressing element to said upper layer of synthetic material of said panels.

Advantageously this allows to obtain a wood-based panel with a highly realistic decorative pattern because of the different shadings and of the different colour reflections.

A person skilled in the art will be allowed to bring suitable modifications and alternatives to the method according to the invention for processing the surface of a pressing element and to the processed pressing element thus obtained, all however falling within the scope of protection of the attached claims.

The invention claimed is:

1. Method for processing a smooth or structured surface of a pressing element, the method comprising the steps of:
   a) chrome-plating said surface of the pressing element so as to form a chrome coating comprising a first layer having chrome grains oriented in a first direction and a second layer overlapping said first layer, said second layer having chrome grains oriented in a second direction which is different from said first direction;
   b) applying a mask on the chrome-plated surface of the pressing element by means of a digital printing technology;
   c) chemically treating the chrome-plated surface of the pressing element on which said mask was applied, said chemical treatment being performed so as to partially remove said chrome coating in the areas of said chrome-plated surface not protected by said mask, d) removing said mask from the chrome-plated surface of the pressing element, obtaining a smooth or structured surface having a coating with areas having a different grade of gloss and colour,
   wherein said chrome-plating of the smooth or structured surface of the pressing element comprises the steps of:
      arranging said pressing element in a chrome-plating bath containing a chrome-plating agent in a first arrangement;
      performing a first chrome-plating on the smooth or structured surface of said pressing element arranged in the chrome-plating bath in said first arrangement for a predetermined time so as to form said first layer having chrome grains oriented in said first direction;
      rotating the pressing element by a predetermined angle of rotation around an axis which is substantially perpendicular to said smooth or structured surface so as to arrange said pressing element in said chrome-plating bath in a second arrangement;
      performing a second chrome-plating on the smooth or structured surface of said pressing element arranged in the chrome-plating bath in said second arrangement for a predetermined time so as to form said second layer having chrome grains oriented in said second direction.

2. Method according to claim 1, wherein the angle of rotation of the pressing element around its own axis which is substantially perpendicular to the surface thereof is comprised in the range between greater than 0° and 180°.

3. Method according to claim 1, wherein the chrome-plating is a direct or intermittent chrome-plating and it is performed for an overall duration comprised between 10 minutes and 2 hours.

4. Method according to claim 1, wherein the chrome coating has an overall thickness comprised between 10 μm and 25 μm.

5. Method according to claim 1, wherein the first layer of the chrome coating has a thickness comprised between 5 μm and 7 μm and the second layer of the chrome coating has a thickness comprised between 8 μm and 15 μm.

6. Method according to claim 1, wherein the chemical treatment is performed by dipping the pressing element in an acid solution having an acid concentration between 7% and 10% by weight on the weight of the solution with an overall residence time of the pressing element in the acid solution comprised between 1 minute and 10 minutes.

7. Method according to claim 1, wherein the chemical treatment of the chrome-plated surface of the pressing element on which said mask was applied comprises the steps of:
   dipping the pressing element in an acid solution and keeping it in the solution for a time which is sufficient to achieve a partial chemical treatment of the chrome-plated surface,
   extracting the pressing element from the acid solution and keeping it outside the acid solution for a predetermined time,
   dipping again the pressing element in the acid solution and keeping it in the solution for a time which is sufficient to complete the chemical treatment of the chrome-plated surface.

8. Method according to claim 1, wherein the smooth or structured surface of the pressing element is pre-treated before the chrome-plating step a) and the pre-treatment is performed by polishing or sandblasting.

9. Method according to claim 1, wherein the surface of the pressing element is structured and the method comprises the steps of:
   applying a mask on the pressing element surface;
   chemically treating the pressing element surface on which the mask was applied;
   removing the mask from the pressing element surface;
   mechanically brushing the pressing element surface;
   optionally sequentially repeating the above-mentioned steps for a predetermined number of times as necessary to obtain a structured surface,
   chrome-plating the structured surface of the pressing element so as to form a chrome coating comprising a first layer having a chrome grains oriented in a first direction and a second layer overlapping said first layer, said second layer having chrome grains oriented in a second direction which is different from said first direction;
   applying a mask on the chrome-plated surface of the pressing element by means of a digital printing technology;
   chemically treating the chrome-plated surface of the pressing element on which said mask was applied, said chemical treatment being performed so as to partially remove said chrome coating in the areas of said chrome-plated surface, wherein said exposed areas are the areas not protected by said mask;
   removing said mask from the chrome-plated surface of the pressing element, obtaining a smooth or structured surface having a coating with areas having a different grade of gloss and color.

10. Method according to claim 1, further comprising after the step d) of removing the mask from the chrome-plated surface, a following step of sandblasting the pressing element surface to increase the reflectance of the pressing element.

11. Method according to claim 1 further comprising, after the step d) of removing the mask from the chrome-plated surface, sequentially repeating at least once the above steps a) to d).

12. Method according to claim 1, comprising a further chrome-plating of the pressing element surface after the step c) of chemically treating the chrome-plated surface and before the step d) of removing the mask from the pressing element.

13. Method according to claim 2, wherein the angle of rotation of the pressing element around its own axis which is substantially perpendicular to the surface thereof is of about 180°.

* * * * *